US012662609B2

(12) United States Patent
Zhang et al.

(10) Patent No.: US 12,662,609 B2
(45) Date of Patent: Jun. 23, 2026

(54) HYBRID RUNNING TRACK ARTICLE AND METHOD FOR PREPARING THE SAME

(71) Applicant: Dow Global Technologies LLC, Midland, MI (US)

(72) Inventors: Chao Zhang, Shanghai (CN); Gang Sun, Shanghai (CN); Xiaolian Hu, Shanghai (CN); Yanli Feng, Shanghai (CN); Shihao Qin, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 358 days.

(21) Appl. No.: 18/248,548

(22) PCT Filed: Dec. 8, 2020

(86) PCT No.: PCT/CN2020/134457
§ 371 (c)(1),
(2) Date: Apr. 11, 2023

(87) PCT Pub. No.: WO2022/120558
PCT Pub. Date: Jun. 16, 2022

(65) Prior Publication Data
US 2023/0407131 A1 Dec. 21, 2023

(51) Int. Cl.
| | |
|---|---|
| *C09D 175/08* | (2006.01) |
| *A63K 1/00* | (2006.01) |
| *C09D 5/02* | (2006.01) |
| *C09D 123/16* | (2006.01) |
| *E01C 13/06* | (2006.01) |
| *E01C 19/12* | (2006.01) |

(52) U.S. Cl.
CPC .............. *C09D 175/08* (2013.01); *A63K 1/00* (2013.01); *C09D 5/022* (2013.01); *C09D 123/16* (2013.01); *E01C 13/065* (2013.01); *E01C 19/12* (2013.01)

(58) Field of Classification Search
CPC .... C09D 175/08; C09D 5/022; C09D 123/16; A63K 1/00; E01C 13/065; E01C 19/12
USPC ................................. 472/85, 92; 404/31, 32
See application file for complete search history.

(56) References Cited

U.S. PATENT DOCUMENTS

| | | | | |
|---|---|---|---|---|
| 5,411,352 A | * | 5/1995 | Eren | ..................... E01C 13/065 404/31 |
| 7,255,897 B2 | | 8/2007 | Temme et al. | |
| 11,773,543 B2 | * | 10/2023 | Fisher | ................... B32B 19/048 404/32 |

FOREIGN PATENT DOCUMENTS

| | | |
|---|---|---|
| CN | 205171316 | 4/2016 |
| CN | 106854397 | 6/2017 |
| CN | 107245924 | 10/2017 |
| CN | 108329455 | 7/2018 |
| CN | 109653059 | 4/2019 |
| CN | 109535991 | 5/2019 |
| CN | 110004794 | 7/2019 |
| CN | 109575767 | 1/2021 |
| CN | 109575220 | 5/2021 |
| EP | 3599254 | 1/2020 |
| WO | 201977924 | 4/2019 |
| WO | 2020097839 | 5/2020 |

OTHER PUBLICATIONS

PCT/CN2020/134457 International Search Report and Written Opinion with a mailing date of May 31, 2021.

* cited by examiner

*Primary Examiner* — Thomas M Sember

(57) ABSTRACT

The present application provides a hybrid running track article, comprising, from top to bottom: (I) a top coating layer made from a first composition comprising an externally emulsified polyurethane dispersion and rubber particles, wherein the externally emulsified polyurethane dispersion is derived from: (Ai) an isocyanate component comprising one or more compounds having at least two isocyanate groups, (Bi) an isocyanate-reactive component comprising one or more compounds having at least two isocyanate-reactive groups; (Ci) an optional catalyst, (Di) an external emulsifier, (Ei) a chain extender and (Fi) water, and (II) a bottom layer made from a second composition comprising a 1K solvent-free polyurethane binder and rubber particles.

9 Claims, 1 Drawing Sheet

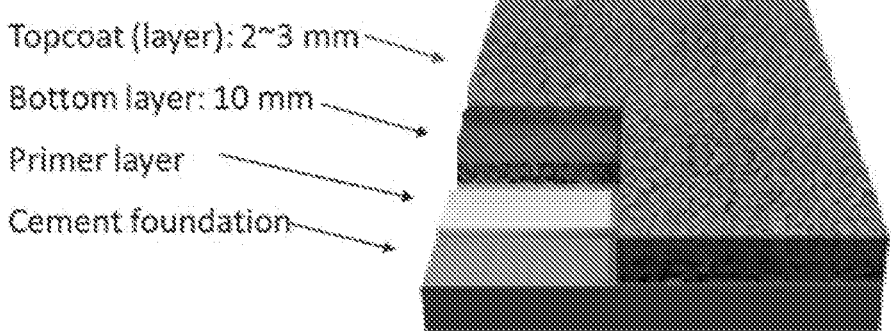
Topcoat (layer): 2~3 mm
Bottom layer: 10 mm
Primer layer
Cement foundation

HYBRID RUNNING TRACK ARTICLE AND METHOD FOR PREPARING THE SAME

FIELD OF THE INVENTION

The present disclosure relates to a hybrid running track article and a method for preparing the same, in particular a hybrid running track article comprising a top coating layer made from a first composition comprising an externally emulsified polyurethane dispersion and rubber particles, and a bottom layer made from a 1K solvent-free polyurethane binder and rubber particles, and a method for preparing the same.

INTRODUCTION

Generally, a running track is a multi-layer structure including a cement foundation, a primer layer, a bottom layer and a top coating layer, as shown in FIG. 1. The primer layer is usually a polyurethane (PU)/epoxy based adhesive. The bottom layer consists of 1K non solvent PU binder and EPDM particles. The top layer consists of solvent-free 2K PU and EPDM particles. Currently, for making the top coating layer, EPDM rubber particles and solvent-free 2K PU are blended in a drum under stirring to get a homogeneous mixture, then the mixture is sprayed on the surface of the bottom layer. Generally, in order to get a high-quality top coating layer, a two-coat spraying process is required. The time interval between two coats is about 24 hours to fully achieve the target mechanical strength in one day after the application.

For current solvent-free 2K PU system, there are many problems during the spraying process. Firstly, the pot life is short. Solvent-free 2K PU system usually comprises two components including isocyanate/prepolymer component and polyols. Before spraying, the two components need to be mixed under a mechanical stirring condition, and then the resulting mixture is charged into a spraying machine for spraying. Generally, the solvent-free 2K PU system will start to gel in 0.5 hours after the two components are mixed. The gelation (residual) will block the spray gun easily, so organic solvents are needed to clean the spray machine every 2 to 3 hours, which will cost VOC issues. Moreover, most of constructors are not certified to use, transport, and store organic solvents. Secondly, the curing time of the solvent-free 2K PU system often needs one night and thus the work efficiency is low.

Therefore, there still remains a constant demand for a running track article exhibiting superior mechanical properties such as tensile strength and elongation at break, short curing time and no VOC issues.

After persistent exploration, we have surprisingly found a hybrid running track which can achieve one or more of the above targets. The present inventors replace current solvent-free 2K PU system with an externally emulsified polyurethane dispersion as a top coating binder of a running track. This replacement has brought about at least the following advantages over the solvent-free 2K PU system: no pot life limitation; no gelation issues; and no need of solvent to clean the spray machine. For running track constructors, they do not need to worry about the troubles caused by organic solvents. The present disclosure has the following advantages: less VOC issues; less health-safety risk during processing; short drying (curing) time after spraying (in 2-3 hours), and higher application efficiency; better mechanical properties than solvent-free 2K PU, and less PU resin dosage than solvent-free 2K PU while maintaining a good coverage, of EPDM by PUD.

SUMMARY OF THE INVENTION

The present disclosure provides a hybrid running track with short drying time, good mechanical properties and no VOC issues.

In a first aspect of the present disclosure, the present disclosure provides a hybrid running track article, comprising, from top to bottom:

(I) a top coating layer made from a first composition comprising an externally emulsified polyurethane dispersion and rubber particles, wherein the externally emulsified polyurethane dispersion is derived from: (Ai) an isocyanate component comprising one or more compounds having at least two isocyanate groups, (Bi) an isocyanate-reactive component comprising one or more compounds having at least two isocyanate-reactive groups; (Ci) an optional catalyst, (Di) an external emulsifier, (Ei) a chain extender and (Fi) water, and (II) a bottom layer made from a second composition comprising a 1K solvent-free polyurethane binder and rubber particles.

In a second aspect of the present disclosure, the present disclosure provides a method for producing the hybrid running track article of the first aspect, comprising:

i) applying a second composition comprising a 1K solvent-free polyurethane binder and rubber particles on the ground;

ii) curing the second composition to obtain a bottom layer;

iii) applying a first composition comprising an externally emulsified polyurethane dispersion and rubber particles, wherein the externally emulsified polyurethane dispersion is derived from: (Ai) an isocyanate component comprising one or more compounds having at least two isocyanate groups, (Bi) an isocyanate-reactive component comprising one or more compounds having at least two isocyanate-reactive groups; (Ci) an optional catalyst, (Di) an external emulsifier, (Ei) a chain extender and (Fi) water;

iv) drying the first composition to form a topcoating layer on the bottom layer.

In a third aspect of the present disclosure, the present disclosure provides the use of an externally emulsified polyurethane dispersion in a top coating layer of a running track article, wherein the externally emulsified polyurethane dispersion is derived from: (Ai) an isocyanate component comprising one or more compounds having at least two isocyanate groups, (Bi) an isocyanate-reactive component comprising one or more compounds having at least two isocyanate-reactive groups; (Ci) an optional catalyst, (Di) an external emulsifier, (Ei) a chain extender and (Fi) water.

According to a preferable embodiment of the first to the third aspects, the externally emulsified polyurethane dispersion does not comprise any cationic or anionic hydrophilic pendant group or a group which can be converted into the cationic or anionic hydrophilic pendant group covalently attached to the backbone chain of the polyurethane.

It is to be understood that both the foregoing general description and the following detailed description are exemplary and explanatory only and are not restrictive of the invention, as claimed.

BRIEF DESCRIPTION OF THE DRAWINGS

FIG. 1 is a schematic illustration of a running track in the prior art.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, the term "composition", "formulation" or "mixture" refers to a physical blend of different components, which is obtained by mixing simply different components by a physical means.

As disclosed herein, "and/or" means "and, or as an alternative". All ranges include endpoints unless otherwise indicated.

As disclosed herein, "solvent" means organic solvent, unless otherwise indicated.

Externally Emulsified Polyurethane Dispersion

The top coating layer is formed by applying a first composition comprising an externally emulsified polyurethane dispersion and rubber particles on the bottom layer.

The top coating layer is made from a first composition comprising an externally emulsified polyurethane dispersion and rubber particles, wherein the externally emulsified polyurethane dispersion is derived from: (Ai) an isocyanate component comprising one or more compounds having at least two isocyanate groups, (Bi) an isocyanate-reactive component comprising one or more compounds having at least two isocyanate-reactive groups; (Ci) an optional catalyst, (Di) an external emulsifier, (Ei) a chain extender and (Fi) water.

The external emulsifiers or the residual moieties of the external emulsifiers are not covalently attached to the backbone chain of the polyurethane.

According to one preferable embodiment, the externally emulsified polyurethane dispersion is aqueous and is basically free of any organic solvent intentionally added therein. Generally, the aqueous dispersion has at most about 1 percent by weight of organic solvent, based on the total weight of the dispersion. Preferably, the aqueous dispersion has at most about 2000 parts per million by weight (ppm), more preferably at most about 1000 ppm, even more preferably at most about 500 ppm and most preferably at most a trace amount of organic solvent.

The expression "externally emulsified polyurethane dispersion" as described herein refers to a polyurethane dispersion comprising limited amount, preferably do not comprise internally emulsifying components and thus mainly relying on the emulsifying function of "external emulsifier" (i.e. ionically or nonionically emulsifiers that are not covalently bonded to the backbone chain within the polyurethane particles dispersed in the liquid medium, especially via the urethane bond derived from the reaction between an isocyanate group and an isocyanate-reactive group (such as a hydroxyl group)) so as to stabilize the polyurethane dispersion.

According to one embodiment of the present disclose, the externally emulsified polyurethane dispersion can be prepared by (i) reacting (Ai) an isocyanate component comprising one or more compounds having at least two isocyanate groups with (Bi) an isocyanate-reactive component comprising one or more compounds having at least two isocyanate-reactive groups in the presence of (Ci) an optional catalyst to form a prepolymer; (ii) dispersing the prepolymer obtained in step (i) in (Fi) water in the presence of (Di) an external emulsifier to form an emulsion; and (iii) further adding (Ei) a chain extender into the emulsion to react with the prepolymer obtained in step (ii) and form the externally emulsified polyurethane dispersion.

According to one embodiment of the present disclosure, the prepolymer prepared in the step (i) does not comprise any ionic internal emulsifier or residual moieties of the ionic internal emulsifier covalently bonded to the urethane prepolymer chain. According to another embodiment of the present disclosure, the polyurethane chain in the prepolymer prepared in the step (i) does not comprise any cationic or anionic pendant group.

In a preferable embodiment of the present disclosure, the externally emulsified polyurethane dispersion is free of any internal emulsifier and there is no anionic or cationic salt group in the backbone chain of the polyurethane particles dispersed in the externally emulsified PUD.

The PU particles dispersed in the externally emulsified PU have a particle size from 20 nm to 5,000 nm, preferably from 50 nm to 2,000 nm, and more preferably from 50 nm to 1,000 nm.

The externally emulsified polyurethane dispersion may have any suitable solids loading of polyurethane particles, but generally the solids loading is between about 1% to about 70% solids by weight of the total dispersion weight, preferably at least about 2%, more preferably at least about 4%, more preferably at least about 6%, more preferably at least about 15%, more preferably at least about 25%, more preferably at least about 30%, most preferably at least about 40%, to at most about 70%, preferably at most 68%, more preferably at most about 65%, more preferably at most about 63% and most preferably at most about 60% by weight.

Generally, the externally emulsified PUD has a viscosity from at least about mPa·s to at most about 5,000 mPa·s, preferably, from at least about 20 mPa·s to at most about 2,000 mPa·s, more preferably, from at least about 30 mPa·s to at most about 1000 mPa·s.

The Isocyanate Component (Ai)

In various embodiments, the isocyanate component (Ai) has an average functionality of at least about 2.0, preferably from about 2 to 10, more preferably from about 2 to about 8, and most preferably from about 2 to about 6. In some embodiments, the isocyanate component includes one or more polyisocyanate compound comprising at least two isocyanate groups. Suitable polyisocyanate compounds include aromatic, aliphatic, cycloaliphatic and araliphatic polyisocyanates having two or more isocyanate groups. In a preferable embodiment, the polyisocyanate component comprises polyisocyanate compounds selected from the group consisting of $C_4$-$C_{12}$ aliphatic polyisocyanates comprising at least two isocyanate groups, $C_6$-$C_{15}$ cycloaliphatic or aromatic polyisocyanates comprising at least two isocyanate groups, $C_7$-$C_{15}$ araliphatic polyisocyanates comprising at least two isocyanate groups, and combinations thereof. In another preferable embodiment, suitable polyisocyanate compounds include tri-phenylene diisocyanate, 2,4-toluene diisocyanate and/or 2,6-toluene diisocyanate (TIM), the various isomers of diphenylmethanediisocyanate (MIN), carbodiimide modified MDI products, hexamethylene-1,6-diisocyanate, tetramethylene-1,4-diisocyanate, cyclohexane-1,4-diisocyanate, hexahydrotoluene diisocyanate, hydrogenated MDI, naphthylene-1,5-diisocyanate, isophorone diisocyanate (trim, or mixtures thereof. In another preferable embodiment, suitable polyisocyanate compounds include isophorone diisocyanate (IPDI).

Alternatively or additionally, the polyisocyanate component may also comprise a isocyanate prepolymer having an isocyanate functionality in the range of 2 to 10, preferably from 2 to 8, more preferably from 2 to 6. The isocyanate prepolymer can be obtained by reacting the above stated monomeric isocyanate components with one or more isocyanate-reactive compounds selected from the group consisting of ethylene glycol, 1,2-propanediol, 1,3-propanediol, 1,3-butanediol, 1,4-butenediol, 1,4-butynediol, 1,5-pentanediol, neopentyl-glycol, bis(hydroxy-methyl) cyclohexanes such as 1,4-bis(hydroxymethyl)cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol and polybutylene glycols. Suitable prepolymers for use as the polyisocyanate component are prepolymers having NCO group contents of from 2 to 40 weight percent, more preferably from 4 to 30 weight percent. These prepolymers are preferably prepared by reaction of the di- and/or poly-isocyanates with materials including lower molecular weight diols and triols. Individual examples are aromatic polyisocyanates containing urethane groups, preferably having NCO contents of from 5 to 40 weight percent, more preferably 20 to 35 weight percent, obtained by reaction of diisocyanates and/or polyisocyanates with, for example, lower molecular weight diols, triols, oxyalkylene glycols, dioxyalkylene glycols, or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, ethylene glycols, propylene glycols, butylene glycols, polyoxypropylene glycols and polyoxypropylene-polyoxyethylene glycols can be used. Polyester polyols can also be used, as well as alkane diols such as butane diol. Other diols also useful include bishydroxyethyl- or bishydroxypropyl-bisphenol A, cyclohexane dimethanol and bishydroxyethyl hydroquinone.

Also advantageously used for the isocyanate component are the so-called modified multifunctional isocyanates, that is, products which are obtained through chemical reactions of the above isocyanates compounds. Exemplary are polyisocyanates containing esters, ureas, biurets, allophanates and preferably carbodiimides and/or uretoneimines. Liquid polyisocyanates containing carbodiimide groups, uretoneimines groups and/or isocyanurate rings, having isocyanate groups (NCO) contents of from 12 to 40 weight percent, more preferably from 20 to 35 weight percent, can also be used. These include, for example, polyisocyanates based on 4,4'-2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and MIDI; and mixtures of toluene diisocyanates and PMDI and/or diphenylmethane diisocyanates.

Generally, the amount of the isocyanate component (Ai) may vary based on the actual requirement of the running track article. For example, as one illustrative embodiment, the isocyanate component (Ai) can be used at an amount to make sure that the content of the isocyanate group in the isocyanate component (Ai) is from about 101 mol % to about 300 mol %, preferably from about 110 mol % to about 280 mol %, more preferably from about 150 mol % to about 250 mol %, more preferably from about 170 mol % to 240 mol %, more preferably from about 180 mol % to 230 mol %, more preferably from 190 mol % to 230 mol %, based on the total molar content of the isocyanate-reactive groups in the isocyanate-reactive component (Bi).

The Isocyanate-Reactive Component (Bi)

In another embodiment of the present disclosure, the isocyanate-reactive component comprises one or more polyols selected from the group consisting of aliphatic polyhydric alcohols comprising at least two hydroxyl groups, cycloaliphatic or aromatic polyhydric alcohols comprising at least two hydroxyl groups, araliphatic polyhydric alcohols comprising at least two hydroxyl groups, polyether polyol, polyester polyol and mixture thereof. Preferably, the polyol is selected from the group consisting of $C_2$-$C_{16}$ aliphatic polyhydric alcohols comprising at least two hydroxyl groups, $C_6$-$C_{15}$ cycloaliphatic or aromatic polyhydric alcohols comprising at least two hydroxyl groups, $C_7$-$C_{15}$ araliphatic polyhydric alcohols comprising at least two hydroxyl groups, polyester polyols having a molecular weight from 100 to 5,000, polyether polyols having a molecular weight from 800 to 12,000, and combinations thereof.

In one embodiment of the present disclosure, the isocyanate-reactive component comprises a mixture of two or more different polyols, such as a mixture of two or more polyether polyols, a mixture of two or more polyester polyols, a mixture of at least one polyether polyols with at least one polyester polyols, or a mixture of a polyester polyol and a monomeric polyol.

In one embodiment, the isocyanate-reactive component is a polyether polyol having a functionality (average number of isocyanate-reactive groups, particularly, hydroxyl group, in a polyol molecule) of 2.0 to 3.0 and a weight average molecular weight (Mw) of 800 to 12,000 g/mol, preferably from 1,000 to 10,000 g/mol, preferably from 1,000 to 8,000 g/mol, more preferably from 1,000 to 4,000 g/mol. The polyether polyols is generally prepared by polymerization of one or more alkylene oxides selected from propylene oxide (PO), ethylene oxide (EO), butylene oxide, tetrahydrofuran and mixtures thereof, with proper starter molecules in the presence of catalyst. Typical starter molecules include compounds having at least 2, preferably from 4 to 8 hydroxyl groups or having two or more primary amine groups in the molecule. Suitable starter molecules are for example selected from the group comprising aniline, FDA, TDA, MDA and PMDA, more preferably from the group comprising TDA and PMDA, most preferably TDA. When TDA is used, all isomers can be used alone or in any desired mixtures. For example, 2,4-TDA, 2,6-TDA, mixtures of 2,4-TDA and 2,6-TDA, 2,3-TDA, 3,4-TDA, mixtures of 3,4-TDA and 2,3-TDA, and also mixtures of all the above isomers can be used. By way of starter molecules having at least 2 and preferably from 2 to 8 hydroxyl groups in the molecule it is preferable to use trimethylolpropane, glycerol, pentaerythritol, castor oil, sugar compounds such as, for example, glucose, sorbitol, mannitol and sucrose, polyhydric phenols, resols, such as oligomeric condensation products of phenol and formaldehyde and Mannich condensates of phenols, formaldehyde and dialkanolamines, and also melamine. Catalyst for the preparation of polyether polyols may include alkaline catalysts, such as potassium hydroxide, for anionic polymerization or Lewis acid catalysts, such as boron trifluoride, for cationic polymerization. Suitable polymerization catalysts may include potassium hydroxide, cesium hydroxide, boron trifluoride, or a double cyanide complex (DMC) catalyst such as zinc hexacyanocobaltate or quaternary phosphazenium compound. In a preferable embodiment of the present disclosure, the polyether polyol includes (methoxy) polyethylene glycol (MPEG), polyethylene glycol (PEG), poly(propylene glycol) or copolymer of ethylene epoxide and propylene epoxide with primary hydroxyl ended group and secondary hydroxyl ended group. Examples of commercially available polyether polyols include, but are not limited to, polyols sold under the trade name VORANOL™, such as VORANOL™ 2000 LM and VORANOL™ 4000LM, VORANOL™ 3010, and VORA-NOL™ 222-056, among others.

In a preferable embodiment, the isocyanate-reactive component is a polyester polyol having a molecular weight from 500 to 5,000, preferably from 1000 to 3,000 g/mol so as to achieve good film formability and elasticity of the PUD top film. The polyester polyol is typically obtained by reacting polyfunctional alcohols having from 2 to 12 carbon atoms, preferably from 2 to 6 carbon atoms, with polyfunctional carboxylic acids having from 2 to 12 carbon atoms, preferably 2 to 6 carbon atoms, or anhydrides/esters thereof. Typical polyfunctional alcohols for preparing the polyester polyol are preferably diols or triols and include ethylene glycol, propylene glycol, butylene glycol, pentylene glycol or hexylene glycol. Typical polyfunctional carboxylic acids can be aliphatic, cycloaliphatic, araliphatic, aromatic or heterocyclic and may be substituted, for example with halogen atoms, and/or may be saturated or unsaturated. Preferably, the polyfunctional carboxylic acids are selected from the group consisting of suberic acid, azelaic acid, phthalic acid, isophthalic acid, phthalic anhydride, tetrahydrophthalic anhydride, hexahydrophthalic anhydride, tetrachlorophthalic anhydride, endomethylene-tetrahydrophthalic anhydride, glutaric anhydride, alkenylsuccinic acid, maleic acid, maleic anhydride, fumaric acid, dimeric fatty acids. Preference is given to dicarboxylic acids represented the general formula. $HOOC—(CH_2)_y—COOH$, where y is an integer from 1 to 20, preferably an even number from 2 to 20. The polyester polyol is preferably terminated with at least two hydroxyl groups. In a preferable embodiment, the polyester polyol has a hydroxyl functionality of 2 to 10, preferably from 2 to 6. In another embodiment, the polyester polyol has a OH number of 80 to 2,000 mgKOH/g, preferably from 150 to 1,000 mgKOH/g, and more preferably from 200 to 500 mgKOH/g. Various molecular weights are contemplated for the polyester polyol. For example, the polyester polyol may have a number average molecular weight of from about 500 g/mol to about 5,000 g/mol, preferably from about 600 g/mol to about 4,000 g/mol, preferably from about 500 g/mol to about 3,000 g/mol, preferably from about 1000 g/mol to about 2,500 g/mol, preferably from about 1200 g/mol to about 2,000 g/mol, and more preferably from about 1,500 g/mol to about 1,800 g/mol.

Alternatively, the polyester polyol includes lactone-based polyesterdids, which are homopolymers or copolymers of lactones, preferably terminal hydroxyl-functional addition products of lactones with suitable difunctional initiator molecules. Preferred lactones are derived from compounds represented by the general formula $HO—(CH_2)_z—COOH$, where z is an integer from 1 to 20 and one hydrogen atom of a methylene unit may also be replaced by a $C_1$ to $C_4$ alkyl radical. Exemplary lactone-based polyesterdiols include ε-caprolactone, β-propiolactone, γ-butyrolactone, methyl-ε-caprolactone or mixtures thereof.

In general, the amount of the isocyanate-reactive component (Bi) used herein can be used at an amount to make sure that the isocyanate-reactive group in the isocyanate-reactive component (Bi) is from about 50 mol % to about 98 mol %, preferably from about 60 mol % to about 97 mol %, more preferably from about 70 mol % to about 96 mol %, more preferably from about 80 mol % to about 96 mol %, more preferably from about 85 mol % to about 95 mol %, based on the total molar content of the isocyanate group in the isocyanate component (Ai).

In the context of the present disclosure, the other compounds comprising functional groups which can react with the isocyanate group, such as the chain extender and water, are not within the definition of the so-called "isocyanate-reactive component". The chain extender and water can be clearly distinguished from the isocyanate-reactive component by the molecular structure or the time point at which they are added.

Catalyst (Ci)

Catalyst (Ci) may include any substance that can promote the reaction between the isocyanate group and the isocyanate-reactive group. Without being limited to theory, the catalysts can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, dimethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof.

Tertiary amine catalysts include organic compounds that contain at least one tertiary nitrogen atom and are capable of catalyzing the hydroxyl/isocyanate reaction. The tertiary amine, morpholine derivative and piperazine derivative catalysts can include, by way of example and not limitation, triethylenediarnine, tetramethylethylenediamine, pentamethyl-diethylene triamine, bis(2-dimethylaminoethyl)ether, triethylamine, tripropylamine, tributyl-amine, triamylamine, pyridine, quinoline, dimethylpiperazine, piperazine, N-ethylmorpholine, 2-methylpropanedianine, methyltri ethylenediamine, 2,4,6-triimethylamine-methyl)phenol. N,N',N"-tris (dimethyl amino-propyl)sym-hexahydro triazine, or mixtures thereof.

In general, the content of the catalyst used herein is larger than r equal to 0% and is at most 1.0 wt %, preferably at most 0.5 wt %, more preferably at most 0.05 wt %, more preferably at most 0.02 wt %, based on the total weight of the isocyanate component (Ai), and the isocyanate-reactive component (Bi). It can be seen that the content of the catalyst is calculated as an additional amount while taking the total amount of the isocyanate component (Ai), and the isocyanate-reactive component (Bi) as 100 wt %.

External Emulsifier (Di)

The external emulsifier r may be cationic, anomic, Lar nonionic, and is preferably anionic. Suitable classes of emulsifiers include, but are not restricted to, sulfates of ethoxylated phenols such as poly(oxy-1,2-ethanediyl)(1-sulfo-w(nonylphenoxy) salt; alkali metal fatty acid salts such as alkali metal oleates and stearates; alkali metal C12-C16 alkyl sulfates such as alkali metal lauryl sulfates; alkali metal C12-C16 alkylbenzene sulfonates such as branched and linear sodium dodecylbenzene sulfonates; anionic and nonionic fluorocarbon emulsifiers such as fluorinated C4-C16 alkyl esters and alkali metal C4-C16 perfluoroalkyl sulfonates. Exemplary external emulsifiers include disodium octadecyl sulfosuccinate, sodium dodecylbenzene sulfonate (SDBS), sodium stearate and ammonium stearate. The polyurethane dispersion may be prepared by any suitable method such as those well known in the art.

According to an embodiment of the present disclosure, the amount of the external emulsifier is from 0.01 wt % to 10 wt %, or from 0.05 wt % to 8 wt %, from 0.1 wt % to 7 wt %, or from 0.2 wt % to 6 wt %, or from 0.5 wt % to 5 wt %, or from 1 wt % to 5 wt %, or from 1 wt % to 3 wt %, based on the total weight of the externally emulsified PUD.

Chain Extender (Ei)

According to one embodiment of the present disclosure, the chain extender (Ei) may be a polyamine, preferably selected from the group consisting of: CA-C15 cycloaliphatic polyamine comprising at least two amine groups within the aliphatic cycle, e.g., piperazine; C2-C16 aliphatic polyamine comprising at least two amine groups, e.g., ethylenediamine; C4-C15 cycloaliphatic polyamine comprising at least two amine groups outside the aliphatic cycle, such as cyclohexanediamine, or C5-C1.5 aromatic polyamine comprising at least two amine groups such as p-xylenediamine; and C7-C15 araliphatic polyamine comprising at least two amine groups. According to a preferable embodiment, the chain extender is a C4-C15 cycloaliphatic polyamine comprising at least two amine groups within the aliphatic cycle or C4-C15 cycloaliphatic polyamine comprising at least two amine groups outside the aliphatic cycle, more preferably C4-C15 cycloaliphatic polyamine comprising two secondary amine group groups within the aliphatic cycle or C4-C15 cycloaliphatic polyamine comprising two primary amine group or secondary amine group groups outside the aliphatic cycle. Preferably, the amine chain extender is piperazine.

According to an embodiment of the present disclosure, the chain extender is used at an amount to make sure that the NCO blocking ratio of the prepolymer to be from about 70.0% to about 98.5%, or from a lower limit of about 70.0%, 75.0%, or 80.0% to an upper limit of about 98.0%, 97.0%, 95.0%, or 85.0%, wherein the prepolymer is prepared by (i) reacting (Ai) an isocyanate component comprising one or more compounds having at least two isocyanate groups with (Bi) an isocyanate-reactive component comprising one or more compounds having at least two isocyanate-reactive groups in the presence of (Ci) an optional catalyst. "NCO blocking ratio" is defined as the molar percentage of the NCO groups in the prepolymer blocked by the chain extender, such as piperazine.

1K Solvent-Free Polyurethane Binder

The 1K solvent-free polyurethane binder can also be called as one-part solvent-free polyurethane prepolymer, which comprises a reaction product formed by reacting (Aii) an isocyanate component comprising one or more compounds having at least two isocyanate groups, (Bii) an isocyanate-reactive component comprising one or more compounds having at least two isocyanate-reactive groups, wherein the detailed description of (Aii) an isocyanate component comprising one or more compounds having at least two isocyanate groups can be referred to (Ai) an isocyanate component comprising one or more compounds having at least two isocyanate groups, and the detailed description of (Bii) an isocyanate-reactive component comprising one or more compounds having at least two isocyanate-reactive groups can be referred to (Bi) an isocyanate-reactive component comprising one or more compounds having at least two isocyanate-reactive groups. The 1K solvent-free polyurethane binder is moisture curable.

Generally, the 1K solvent-free polyurethane binder has at most about 1 percent by weight of organic solvent, based on the total weight of the dispersion. Preferably, the aqueous dispersion has at most about 2000 parts per million by weight (ppm), more preferably at most about 1000 ppm, even more preferably at most about 500 ppm and most preferably at most a trace amount of organic solvent.

Preferably, 1K solvent-free polyurethane binder comprises a reaction product formed by reacting a diphenylmethane diisocyanate (MDI) component and a polyol. The diphenylmethane diisocyanate (MDI) component can also be replaced with a TDI component, an trim component, a HDI component, a H12MDI component, or a mixture thereof.

In an embodiment of the present disclosure, the 1K solvent-free polyurethane binder includes a reaction product formed by reacting from 15 to 50 weight percent of a diphenylmethane diisocyanate component and from 50 to 85 weight percent of a polyol, based upon a total weight of the diphenylmethane diisocyanate component and the polyol. The diphenylmethane diisocyanate (MDI) component can also be replaced with a TDI component, an IPDI component, a HDI component, a H12MDI component, or a mixture thereof.

The diphenylmethane diisocyanate component may include from 90 to 100 weight percent of 4,4'-diphenylmethane diisocyanate percent based upon a total weight of the diphenylmethane diisocyanate component. All individual values and subranges from 90 to 100 weight percent are included; for example, the diphenylmethane diisocyanate component may include from a lower limit of 90, 93, or 95 weight percent to an upper limit of 100, 99, or 97 weight percent of 4,4'-diphenymethane diisocyanate based upon the total weight of the diphenylmethane diisocyanate component. The diphenylinethane diisocyanate component may also include 2,2'-diphenylmethane diisocyanate, 2,4'-diphenyimethane diisocyanate, and/or impurities known in the art.

The polyol may a weight average molecular weight from 300 to 12,000 g/mol. All individual values and subranges from 300 to 12,000 g/mol are included; for example, the polyol can have a weight average molecular weight from a lower limit of 300; 500; 750; 1,000; 1,250; 1,500; 1,750; 2,000; or 2,250 g/mol to an upper limit of 12,000; 11,000; 10,000, 9,000; 8,000; 7,000; 6,000; 5, 00; or 4,500.

The polyol may have an average functionality from 1.5 to 3.5. All individual values and subranges from 1.5 to 3.5 are included; for example, the polyol can have an average functionality from a lower limit of 1.5, 1.6, 1.7, or 1.8, to an upper limit of 0.1.5, 3.4, 3.3, or 3.2.

The polyol can be a polyether polyol, a polyester polyol, and combinations thereof. Examples of commercially available polyols include, but are not limited to, polyols sold under the trade name. VORANOL™, such as VORANOL™ WD 2130 and VORANOL™ 4000LM, TERCAROL™, and VORATEC™, among others.

The polyol can include a polyether polyol. Polyether polyols can be prepared by known processes. For instance, polyether polyols can be prepared by anionic polyaddition of at least one alkylene oxide, e.g., ethylene oxide or 1,2-propylene oxide or 1,2-propylene oxide and ethylene oxide, A starter compound, which may be referred to as an initiator is any organic compound that is to be alkoxylated in the polymerization reaction. The initiator may contain 2 or more hydroxyl and/or amine groups. Mixtures of starter compounds/initiators may be used. Examples of initiator compounds include, but are not limited to, ethylene glycol, diethylene glycol, tri ethylene glycol, propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol, sucrose, as well as alkoxylates (especially ethoxylates and/or propoxylates) of any of these, polyamines, dialkanolamines.

The polyol can include a polyester polyol. Polyesterpolyols may be prepared from, for example, organic dicarboxylic acids having from 2 to 12 carbon atoms, including aromatic dicarboxylic acids having from 8 to 12 carbon atoms and polyhydric alcohols, including diols having from 2 to 12 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomeric naphthalene-dicarboxylic acids. The dicarboxylic acids may be used either individually or mixed with one another. Free dicarboxylic acids may be replaced by a corresponding dicarboxylic acid derivative, for example, dicarboxylic esters of alcohols having 1 to 4 carbon atoms or dicarboxylic anhydrides. Some particular examples may utilize dicarboxylic acid mixtures including succinic acid, glutaric acid and adipic acid in ratios of, for instance, from 20 to 35:35 to 50:20 to 32 parts by weight, and adipic acid, and mixtures of phthalic acid and/or phthalic anhydride and adipic acid, mixtures of phthalic acid or phthalic anhydride, isophthalic acid and adipic acid or dicarboxylic acid mixtures of succinic acid, glutaric acid and adipic acid and mixtures of terephthalic acid and adipic acid or dicarboxylic acid mixtures of succinic acid, glutaric acid and adipic acid. Examples of dihydric and polyhydric alcohols are ethanediol, diethylene glycol, 1,2- and 1,3-propanediol, dipropylene glycol, 1,4-butanediol, 1,5-pentanedial, 1,6-hexanediol, 1,10-decanediol, glycerol, trimethylolpropane, among others. Some particular examples provide that ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6hexanediol. Furthermore, polyester-polyols made from lactones, e.g., e-caprolactone or hydroxycarboxylic acids, e.g., w-hydroxycaproic acid and hydrobenzoic acid, may also be employed.

Polyester polyols can be prepared by polycondensing organic polycarboxylic acids and/or derivatives thereof with polyhydric alcohols in a molar ratio of from 1:1 to 1:1.8, e.g., from 1:1.05 to 1:1.2, for instance.

The reaction product can be formed by reacting from 15 to 50 weight percent of the diphenylmethane diisocyanate component and from 50 to 85 weight percent of a polyol, based upon a total weight of the diphenylmethane diisocyanate component and the polyol. All individual values and subranges from 15 to 50 weight percent of diphenylmethane diisocyanate component are included; for example, the reaction product can be formed by reacting from a lower limit of 15, 20, or 25 weight percent to an upper limit of 50, 45, or 40 weight percent of diphenylmethane diisocyanate component, based upon the total weight of the diphenylmethane diisocyanate component and the polyol.

All individual values and subranges from 50 to 85 weight percent of the polyol are included; for example, the reaction product can be formed by reacting from a lower limit of 50, 55, or 60 weight percent to an upper limit of 85, 80, or 75 weight percent of the polyol, based upon the total weight of the diphenylmethane diisocyanate component and the polyol.

The reaction product can be formed using known equipment and reaction conditions. For instance, the reactants, i.e. the diphenylmethane diisocyanate component and the polyol may be heated to any desirable temperature for a specified time sufficient to effectuate a desirable chemical/physical transformation. As an example, the reaction product can be formed at a temperature from $20° C.$ to $100° C.$; the reaction may occur, e.g. be maintained, from about 5 minutes to about 8 hours; and the reaction may occur in an inert environment, such as a nitrogen environment.

The 1K polyurethane binder disclosed herein may also use an aliphatic isocyanate.

The aliphatic isocyanate may have an average functionality from 1.5 to 3.5. All individual values and subranges from 1.5 to 3.5 are included; for example, the polyol can have an average functionality from a lower limit of 1.5, 1.6, 1.7, 1.8, or 2.0 to an upper limit of 3.5, 3.4, 3.3, 3.2, or 3.0.

Examples of aliphatic isocyanates include, but are not limited to, isophorone diisocyanate, isophorone diisocyanate trimer, hexamethylene diisocyanate trimer, methylene dicyclohexyl diisocyanate, and hydrogenated methylene dicyclohexyl diisocyanate. Preferably, the aliphatic isocyanate is selected from isophorone diisocyanate, isophorone diisocyanate trimer, hexamethylene diisocyanate trimer, and combinations thereof.

The 1K polyurethane binder disclosed herein includes 0.5 to 20 weight percent of the aliphatic isocyanate based upon a total weight of the diphenylmethane diisocyanate component, the polyol, and the aliphatic isocyanate. All individual values and subranges from 0.5 to 20 weight percent are included; for example, the 1K polyurethane binder can include from a lower limit of 0.5, 0.7, 1.0, or 2.0 weight percent to an upper limit of 20, 18, 15, 10, 8, or 6 weight percent of the aliphatic isocyanate based upon the total weight of the diphenylmethane diisocyanate component, the polyol, and the aliphatic isocyanate.

The aliphatic isocyanate may be utilized in a weight ratio with the diphenylmethane diisocyanate component from 1:20 to 1:5. All individual values and subranges from 1:5 to 1:20 are included; for example, the aliphatic isocyanate may be utilized in a weight ratio with the diphenylmethane diisocyanate component from a lower limit of 1:20, 1:18, or 1:16 to an upper limit of 1:5, 1:5.5, or 1:6.

The 1K polyurethane binder disclosed herein may optionally include a quaternizing agent. Examples of quaternizing agents include, but are not limited to, alkyl halides, aralkyl halides, dialkyl carbonates, dialkyl sulphates, epoxides, and combinations thereof. Examples of particular quaternizing agents include, but are not limited to, methyl chloride, ethyl chloride, benzyl chloride, methyl bromide, ethyl bromide, benzyl bromide, dimethyl sulfate, diethyl sulfate, ethylene oxide, propylene oxide, butylene oxide, styrene oxide, epichlorohydrin, and combinations thereof. In one or more embodiments of the present disclosure, the quaternizing agent is benzyl chloride.

The 1K polyurethane binder disclosed herein may include 20 to 200 parts per million of the quaternizing agent based upon the total weight of the diphenylmethane diisocyanate component and the polyol. All individual values and subranges from 20 to 200 parts per million are included; for example, the 1K polyurethane binder can include from a lower limit of 20, 30, or 50 to an upper limit of 200, 175, or 150 parts per million of the quaternizing agent, based upon the total weight of the diphenylmethane diisocyanate component and the polyol.

The 1K polyurethane disclosed herein can include an additive. Examples of additives include, but are not limited to, organic acids, phosphoric acids, fillers, thixotropic agents, antioxidants, pigments, UV absorbers, adhesion promoters, drying agents, and combinations thereof, among others. Different amount of the additive may, be utilized for various applications.

The 1K polyurethane binder can be prepared, e.g., mixed, combined, under conditions known for one-part, moisture curable compositions.

The 1K polyurethane binder disclosed herein can have an NCO content from 3.0 to 12.0 weight percent, based upon a total weight of the 1K polyurethane binder. All individual values and subranges from 3.0 to 12.0 weight percent are included; for example, the 1K polyurethane binder can have an NCO content from a lower limit of 3.0, 5.0, or 7.0 weight percent to an upper limit of 12.0, 11.0, or 10.0 weight percent based upon the total weight of the 1K polyurethane binder.

The 1K polyurethane binder disclosed herein can have a viscosity at 25° C. from 1,000 to 6,000 mPa s, as determined according to ASTM D4889. All individual values and subranges from 1,000 to 6,000 mPa·s are included; for example, the 1K polyurethane binder can have a viscosity at 25° C. from a lower limit of 1,000; 1,250; or 1,500 mPa s to an upper limit of 6,000; 5,000; or 4,500 mPa·s, as determined according to ASTM D4889.

As mentioned, the 1K polyurethane binder disclosed herein is moisture curable. In other words, the 1K polyurethane binder can be cured by exposure to water, e.g., water vapor, to form a cured product. Ambient humidity generally is adequate to promote cure the 1K polyurethane binder. The humidity of curing may be adjusted, as is known in the art, to affect the curing for a number of applications. Additionally, a temperature of curing, as is known in the art, may be utilized. The temperature of curing may be adjusted for some applications, e.g., where an increased temperature of curing may expedite the cure, for instance.

The 1K solvent-free polyurethane binder can be commercially available, such as under the trademark Voramer MR 1045L.

The First Composition and the Second Composition

The rubber particles in the first composition for making the top coating layer are EPDM particles. The rubber particles, preferably EPDM particles, in the first composition for making the top coating layer have an average particle size ranging from 0.1-4.5 mm, preferably 0.5-2.5 mm. The thickness of the top coating layer can be 0.5-10 mm, preferably 1-5 mm, more preferably 2-3 mm.

In the first composition for making the top coating layer, the weight ratio of the externally emulsified polyurethane dispersion to the rubber particles (preferably EPDM particles) is from 1:0.5~3, preferably 1:0.8~2, more preferably 1:1~1:5.

According to one embodiment of the present disclosure, the rubber particles in the second composition for making the bottom layer are EPDM particles. The rubber particles, preferably EPDM particles, in the second composition for making the bottom layer have an average particle size ranging from 2-10 mm, preferably 3-5 mm. The thickness of the bottom layer can be 2-25 mm, preferably 5-20 mm, more preferably 8-12 mm, even more preferably 8-10 mm.

In the second composition for making the bottom layer, the weight ratio of the 1K solvent-free polyurethane binder and the rubber particles (preferably EPDM particles) is 1:3~12, preferably 1:6~10, more preferably 1:7.

Auxiliary Agents and Additives

The first composition and the second composition may independently and optionally comprise any additional auxiliary agents and/or additives for specific purposes.

In one embodiment of the present disclosure, one or more of the auxiliary agents and/or additives may be selected from the group consisting of fillers, dyes/pigments, surface-active compounds, handfeeling agents, dullers, rheological modifiers, defoaming agents, crosslinkers and stabilizers.

Any suitable rheological modifier may be used such as those known in the art. Preferably, the rheological modifier is one that does not cause the dispersion to become unstable. More preferably, the rheological modifier is a water soluble thickener that is not ionized. Examples of useful rheological modifiers include methyl cellulose ethers, alkali swellable thickeners (e.g., sodium or ammonium neutralized acrylic acid polymers), hydrophobically modified alkali swellable thickeners (e.g., hydrophobically modified acrylic acid copolymers) and associative thickeners (e.g., hydrophobically modified ethylene-oxide-based urethane block copolymers) Preferably the rheological modifier is a methylcellulose ether. The amount of thickener is from at least about 0.2% to about 5% by weight of the total weight of the first or second composition, preferably from about 0.5% to about 2% by weight.

Dyes/pigments can also be generally termed as "color masterbatch" in the present disclosure. For example, the color masterbatch may be added so as to impart the layer with a desired color. Examples of dyes/pigments may include iron oxides, titanium oxide, carbon black and mixtures thereof. The amount of the dyes/pigments may be 0.01% to 15%, preferably 0.5-10%, more preferably 1% to 5% by weight, based on the total weight of the first or second composition.

Examples of suitable fillers comprise glass fibers, mineral fibers, natural fibers, such as flax, jute or sisal for example, glass flakes, silicates such as mica or glimmer, salts, such as calcium carbonate, chalk or gypsum. The fillers are typically used in an amount from 0.5% to 60% by weight and preferably from 3% to 30% by weight, based on the overall dry weight of the top coating, or bottom layer.

Manufacture Technology

The hybrid running track article of the present application can be produced by a method comprising:

i) applying a second composition comprising a 1K solvent-free polyurethane binder and rubber particles on the ground;

ii) curing the second composition to obtain a bottom layer;

iii) applying a first composition comprising an externally emulsified polyurethane dispersion and rubber particles, wherein the externally emulsified polyurethane dispersion is derived from: (Ai) an isocyanate component comprising one or more compounds having at least two isocyanate groups, (Bi) an isocyanate-reactive component comprising one or more compounds having at least two isocyanate-reactive groups; (Ci) an optional catalyst, (Di) an external emulsifier, (Ei) a chain extender and (Fi) water;

iv) drying the first composition to form a topcoating layer on the bottom layer.

The first composition and the second composition may be applied by conventional coating technologies such as spraying blade coating, die coating, cast coating, etc.

The second composition may be cured at RT (−20 to 40° C.) for one day.

The first composition may be dried at 0° C. to 40° C. for 1-5 hours under sunshine (less fog and moisture).

The running track article of the present disclosure may further comprise one or more adhesive layers between the bottom layer and the ground. The one or more adhesive layers between the bottom layer and the ground may be applied by conventional coating technologies such as spraying coating, blade coating, die coating, cast coating, etc.

EXAMPLES

Some embodiments of the invention will now be described in the following Examples, wherein all parts and percentages are by weight unless otherwise specified.

The information of the raw materials used in the examples is listed in the following table 1:

TABLE 1

| Raw materials | | |
| --- | --- | --- |
| Chemicals | Feature | Supplier |
| Isophorone diisocyanate (IPDI) | Isocyanate, Functionality = 2 | Evonik |
| MPEG 1000 | Mw = 1000, Functionality = 1 | Sinopharm |
| Voranol 4000 LM | Mw = 4000, Functionality = 2 | Dow |
| Voranol 2000 LM | Mw = 2000, Functionality = 2 | Dow |
| Voranol 3010 | Mw = 3000, Functionality = 3 | Dow |
| Voranol 222-056 | Mw = 2000, Functionality = 2 | Dow |
| DBTDL T12 | Catalyst | Air product |
| Sodium dodecyl benzene sulfonate (SDBS) | Surfactant | SCRC |
| Piperazine | Amine chain extender | SCRC |

TABLE 1-continued

| Raw materials | | |
| --- | --- | --- |
| Chemicals | Feature | Supplier |
| Voramer MR 1045L | 1K polyurethane binder for running track | Dow |
| EPDM | EPDM particles | Zhejiang Running Sport |
| Red paste | Color paste | Zhejiang Running Sport |

Prepolymer Preparation

Polyols were charged into a three neck flask and dehydrated at 110V under 76 mmHg pressure for one hour, then the dehydrated polyol mixture was naturally cooled down to 70-75° C. IPDI was poured into the dehydrated polyol mixture at 70~75° C. under nitrogen ($N_2$) flow protection and mechanical stirring, then the catalyst T12 was added into the reactants. The reaction lasted one hour at 70-75° C., and then the reactants were heated to 80~85 to continuously react 2-3 hours. The product (prepolymer) was packaged with plastic bottle and stored hermetically under nitrogen protection.

PUD Preparation

The above prepolymer was poured into a 1000 ml plastic cup, and stirred with a disperser machine. SDBS aqueous solution was slowly added into the prepolymer under high speed mixing (3,800 to 4,000 RPM). After mixing for several minutes, the deionized water was dropwisely added into the prepolymer under a high-speed mixing (3,800 to 4,000 RPM). The mixing speed was slowed down to no more than 1,500 RPM once phase reversal occurred. At this moment, an emulsion was formed. After that, the chain extender-piperazine aqueous solution was dropwisely added into the emulsion. After all the chain extender solution had been added, mechanical stirring continued for additional 10 to 15 minutes. Finally, a polyurethane dispersion with 50% solid content was obtained and stored in a plastic container with cover. There are 12 PUDs made from 3 prepolymers.

Details of the formulation and PUD performance are listed in Table 1.

| No. | Comp Ex 1 | Comp Ex 2 | Inv Ex 1 | Inv Ex 2 | Comp Ex 3 | Comp Ex 4 |
| --- | --- | --- | --- | --- | --- | --- |
| Prepolymer | 300G-4 | 300G-1 | 300G-2 | 300G-3 | EX5-4 | EX5-1 |
| IPDI (wt %) | 27 | 27 | 27 | 27 | 27 | 27 |
| MPEG 1000 (wt %) | 2 | 2 | 2 | 2 | 2 | 2 |
| VORANOL 4000 LM (wt %) - PO homopolymer diol w/Mn of ~4000 g/mol | | | | | | |
| VORANOL 2000 LM (wt %) - PO homopolymer diol w/Mn of ~2000 g/mol | 20 | 20 | 20 | 20 | 42 | 42 |
| VORANOL 3010 (wt %) - PO + PO/EO Hetero triol, 7-8% Hetero | | | | | | |
| VORANOL 222-056 (wt %) - PO diol, 13% EO-capped, 61% primary OH's | 51 | 51 | 51 | 51 | 29 | 29 |
| T12 (wt %) | 0.01 | 0.01 | 0.01 | 0.01 | 0.01 | 0.01 |
| Total (wt %) | 100.01 | 100.01 | 100.01 | 100.01 | 100.01 | 100.01 |
| NCO Content (wt. % NCO) | 7.1 | 7.1 | 7.1 | 7.1 | 7.1 | 7.1 |
| PU Dispersion | | | | 300 G | | |
| Prepolymer (wt %) | 46.73 | 46.08 | 45.66 | 45.25 | 46.73 | 46.08 |
| SDBS (23 wt % in water soln), (wt %) | 6.07 | 5.99 | 5.94 | 5.88 | 6.07 | 5.99 |

-continued

| | | | | | | |
|---|---|---|---|---|---|---|
| NCO blocking ratio | 48.16% | 67.41% | 83.91% | 97.68% | 48.16% | 67.41% |
| Piperazine (10 wt % in water soln), (wt %) | 16.36 | 22.58 | 27.85 | 32.13 | 16.36 | 22.58 |
| Deionized water (wt %) | 30.84 | 25.35 | 20.55 | 16.74 | 30.84 | 25.35 |
| Total (wt %) | 100 | 100 | 100 | 100 | 100 | 100 |
| PUD Solid Content, wt % | 49.76% | 49.72% | 49.81% | 49.82% | 49.76% | 49.72% |
| PUD Dry Film | | | | | | |
| Tensile Strength, MPa | 9.6 | 12.16 | 19.81 | 20.38 | 12.71 | 15.91 |
| Elongation at Break, % | 972 | 928 | 838 | 800 | 966 | 943 |
| Modulus at 100% Scant, Mpa | 2.07 | 2.81 | 3.46 | 3.46 | 2.64 | 3.4 |
| Accel. Storage Stability Test | | | | | | |
| Viscosity, Initial, mPa-s | 256 | 2499 | 1200 | 109 | 61 | 700 |
| Viscosity after 2 weeks at 54° C., mPa-s | Gelled | Gelled | 1400 | 250 | Gelled | Gelled |
| Median Particle Size, Initial, nm | 186 | 504/172 | 154 | 200 | 244 | 278 |
| Median Particle Size, after 2 wks at 54° C., nm | n/a | n/a | 277 | 272 | n/a | n/a |

| No. | Inv Ex 3 | Inv Ex 4 | Comp Ex 5 | Comp Ex 6 | Inv Ex 5 | Comp Ex 7 |
|---|---|---|---|---|---|---|
| Prepolymer | EX5-2 | EX5-3 | H18-4 | H18-1 | H18-2 | H18-3 |
| IPDI (wt %) | 27 | 27 | 25.8 | 25.8 | 25.8 | 25.8 |
| MPEG 1000 (wt %) | 2 | 2 | 2 | 2 | 2 | 2 |
| VORANOL 4000 LM (wt %) - PO homopolymer diol w/Mn of ~4000 g/mol | | | 42.2 | 42.2 | 42.2 | 42.2 |
| VORANOL 2000 LM (wt %) - PO homopolymer diol w/Mn of ~2000 g/mol | 42 | 42 | | | | |
| VORANOL 3010 (wt %) - PO + PO/EO Hetero triol, 7-8% Hetero | | | 10 | 10 | 10 | 10 |
| VORANOL 222-056 (wt %) - PO diol, 13% EO-capped, 61% primary OH's | 29 | 29 | 20 | 20 | 20 | 20 |
| T12 (wt %) | 0.01 | 0.01 | 0.01 | 0.01 | 0.01 | 0.01 |
| Total (wt %) | 100.01 | 100.01 | 100.01 | 100.01 | 100.01 | 100.01 |
| NCO Content (wt. % NCO) | 7.1 | 7.1 | 7.5 | 7.5 | 7.5 | 7.5 |
| PU Dispersion | | | | | H18 | |
| Prepolymer (wt %) | 45.66 | 45.25 | 46.51 | 46.08 | 45.45 | 45.05 |
| SDBS (23 wt % in water soln), (wt %) | 5.94 | 5.88 | 6.05 | 5.99 | 5.91 | 5.86 |
| NCO blocking ratio | 83.91% | 97.68% | 48.19% | 67.72% | 84.67% | 98.95% |
| Piperazine (10 wt % in water soln), (wt %) | 27.85 | 32.13 | 17.21 | 23.96 | 29.55 | 34.23 |
| Deionized water (wt %) | 20.55 | 16.74 | 30.23 | 23.97 | 19.09 | 14.86 |
| Total (wt %) | 100 | 100 | 100 | 100 | 100 | 100 |
| PUD Solid Content, wt % | 49.81% | 49.82% | 49.62% | 49.85% | 49.76% | 49.82% |
| PUD Dry Film | | | | | | |
| Tensile Strength, MPa | 18.58 | 25.85 | 8.23 | 10.89 | 12.62 | 12.13 |
| Elongation at Break, % | 821 | 742 | 334 | 377 | 379 | 384 |
| Modulus at 100% Scant, Mpa | 3.84 | 4.6 | 3.94 | 4.87 | 5.43 | 5.15 |
| Accel. Storage Stability Test | | | | | | |
| Viscosity, Initial, mPa-s | 38 | 153 | 37 | 119 | 125 | 167 |
| Viscosity after 2 weeks at 54° C., mPa-s | 83 | 200 | Gelled | Gelled | 178 | Gelled |
| Median Particle Size, Initial, nm | 294/223 | 201 | 195 | 204 | 193 | 590 |
| Median Particle Size, after 2 wks at 54° C., nm | 252/324 | 201 | n/a | n/a | 194 | n/a |

Running Track Preparation

3006 PUD and HIS PUD (marked MID name in Table 1) were used for making a running track article.

A composition comprising 1K PU Dow Voramer MR 1045L binder and EPDM particles at a weight ratio of PU hinder to EPDM particles of 1 to 7 was applied on a release layer (an agricultural film) to form a bottom layer (0.5*0.5 m2) and cured at a temperature of RT for 24 h. After curing, the bottom layer had a thickness of 10 mm.

A formulation of PUD (50 wt. % solid content), EPDM particles and color paste (both particle and color paste were offered by Zhejiang Running Sport Co. Ltd.) at a weight ratio of PUD:EPDM particles:color paste of 1:1:0.05 was sprayed on to the bottom layer by a spraying machine. The spraying was carried out twice. The second spraying was done after the first spray layer was dried for 2 hours in winter, which was much faster than 2K solvent-free system topcoat (which needs one night to cure). The topcoating layer had a thickness of 2-3 mm. Then the release layer was peeled off. The final running track performance is listed in Table 3.

TABLE 3

The performance of the PUD based sample prepared in field trial

| Description | PUD 300G based sample | PUD H18 based sample | Application requirement (GB/T14833-2011) |
|---|---|---|---|
| Bottom layer | Dow 1045L + EPDM (PU:EPDM = 1:7) | Dow 1045L + EPDM (PU:EPDM = 1:7) | NA |
| Top layer | PUD 300G (50 wt % solid):EPDM:color paste = 1:1:0.05 | PUD H18(50 wt % solid):EPDM:color paste = 1:1:0.05 | NA |
| Tensile strength (MPa) | 0.53 | 0.48 | ≥0.4 |
| Elongation at break (%) | 91 | 71 | ≥40 |
| Drying time of the topcoating layer | ~2 hour in Winter | ~2 hour in Winter | |

According to the mechanical properties listed in Table 3, in comparison with the Chinese Standard (GB/T14833-2011) which requires a tensile strength ≥0.4 MPa and an elongation ≥40%, both of the samples have stronger tensile strength and longer elongation, which means both are much better than the Chinese standard.

Moreover, neither the spray process nor the PUD synthesis process uses any organic solvent, which is more eco-friendly than previous 2K PU spray process. Secondly, the PU resin loading is also lower than 2K PU, which means lower prices. Finally, the drying time of PUD based top coating layer is very fast, around 2 hours in winter, which is much faster than traditional 2K PU top coating system (which can save construction time).

Determination of the Tensile Strength and Elongation at Break (%)

The tensile strength and elongation at break (%) were tested according to GB/T 14833-2011.

Determination of Medium Particle Size

The medium particle size of the polyurethane particles was tested by a Particle Sizer (Model: LS230, available from Beckman Coulter, INC).

Determination of Viscosity

Viscosity was determined with a TA instrument AR2000ex at 25° C. or clearly specified temperature, utilizing an aluminum plate, continuous flow, and a shear rate of 1-100 $S^{-1}$.

Determination of NCO Content

NCO content (weight %) was determined through titration as follows. Toluene and a mixture of dibutylamine (DBA) (155 ml) and N,N-dimethylformamide (DMF) (350 ml) were each dried via sieve for approximately 12 hours.

For sample testing, the sample to be tested was added to a container and weighed; then dried toluene (6 ml) and the dried mixture of DBA and DMF (2 ml) were added to the container, followed by the addition of isopropanol (10 ml). Hydrochloric acid (0.5) was utilized to titrate the contents of the container.

NCO content (%) was calculated by the following formula $$NCO\ \% = \frac{4.202 \times (B - S) \times N}{W}$$

where B is the volume of consumed hydrochloric acid in blank test; S is the volume of consumed hydrochloric acid in sample test; N is the concentration of hydrochloric acid (0.5 M), and W is the weight of sample.

The invention claimed is:

1. A hybrid running track article, comprising, from top to bottom:
   (I) a top coating layer made from a first composition comprising an externally emulsified polyurethane dispersion and rubber particles, wherein the externally emulsified polyurethane dispersion is derived from: (Ai) an isocyanate component comprising one or more compounds having at least two isocyanate groups, (Bi) an isocyanate-reactive component comprising one or more compounds having at least two isocyanate-reactive groups; (Ci) an optional catalyst, (Di) an external emulsifier, (Ei) a chain extender and (Fi) water, and
   (II) a bottom layer made from a second composition comprising a 1K solvent-free polyurethane binder and rubber particles,
   wherein the (Ei) chain extender is $C_4$-$C_{15}$ cycloaliphatic polyamine comprising at least two amine groups within the aliphatic cycle, $C_4$-$C_{15}$ cycloaliphatic polyamine comprising at least two amine groups outside the aliphatic cycle or a mixture thereof.

2. The hybrid running track article of claim 1, wherein the (Bi) isocyanate-reactive component comprising one or more compounds having at least two isocyanate-reactive groups is a polyether polyol.

3. The hybrid running track article of claim 1, wherein the (Di) external emulsifier is selected from the group consisting of ethoxylated phenols; alkali metal fatty acid salts; alkali metal C12-C16alkyl sulfates; alkali metal C12-C16alkylbenzene sulfonates; anionic and nonionic fluorocarbon emulsifiers.

4. The hybrid running track article of claim 1, wherein the (Ei) chain extender is used at an amount to make sure that the NCO blocking ratio of the prepolymer is from about 70.0% to about 98.5%, wherein the prepolymer is prepared by (i) reacting (Ai) an isocyanate component comprising one or more compounds having at least two isocyanate groups with (Bi) an isocyanate-reactive component comprising one or more compounds having at least two isocyanate-reactive groups in the presence of (Ci) an optional catalyst.

5. The hybrid running track article of claim 1, wherein the 1K solvent-free polyurethane binder is moisture curable.

6. The hybrid running track article of claim 1, wherein the weight ratio of the externally emulsified polyurethane dispersion to the rubber particles is from 1:0.5~1.5.

7. The hybrid running track article of claim 1, wherein the rubber particles are EPDM particles.

8. A method for producing a hybrid running track article having, from top to bottom, a top coating layer made from a first composition and a bottom layer from a second composition, the method comprising:

i) applying the second composition comprising a 1K solvent-free polyurethane binder and rubber particles on the ground;

ii) curing the second composition to obtain the bottom layer;

iii) applying the first composition comprising an externally emulsified polyurethane dispersion and rubber particles, wherein the externally emulsified polyurethane dispersion is derived from: (Ai) an isocyanate component comprising one or more compounds having at least two isocyanate groups, (Bi) an isocyanate-reactive component comprising one or more compounds having at least two isocyanate-reactive groups; (Ci) an optional catalyst, (Di) an external emulsifier, (Ei) a chain extender and (Fi) water;

iv) drying the first composition to form the top coating layer on the bottom layer.

9. A use of an externally emulsified polyurethane dispersion as a top coating layer of a running track article, wherein the externally emulsified polyurethane dispersion is derived from: (Ai) an isocyanate component comprising one or more compounds having at least two isocyanate groups, (Bi) an isocyanate-reactive component comprising one or more compounds having at least two isocyanate-reactive groups; (Ci) an optional catalyst, (Di) an external emulsifier, (Ei) a chain extender and (Fi) water, wherein the (Ei) chain extender is $C_4$-$C_{15}$ cycloaliphatic polyamine comprising at least two amine groups within the aliphatic cycle, $C_4$-$C_{15}$ cycloaliphatic polyamine comprising at least two amine groups outside the aliphatic cycle or a mixture thereof.

* * * * *